US008522297B2

(12) United States Patent
Carro

(10) Patent No.: US 8,522,297 B2
(45) Date of Patent: Aug. 27, 2013

(54) SYSTEM, METHOD AND PROGRAM FOR IDENTIFYING WEB INFORMATION RELATED TO SUBJECTS IN A PROGRAM BROADCAST

(75) Inventor: Fernando Incertis Carro, Valencia (ES)

(73) Assignee: International Business Machines Corporation, Armonk, NY (US)

( * ) Notice: Subject to any disclaimer, the term of this patent is extended or adjusted under 35 U.S.C. 154(b) by 1536 days.

(21) Appl. No.: 11/189,278

(22) Filed: Jul. 26, 2005

(65) Prior Publication Data

US 2006/0080720 A1   Apr. 13, 2006

(30) Foreign Application Priority Data

Sep. 29, 2004   (EP) .................................... 04300638

(51) Int. Cl.
*H04N 7/16* (2011.01)
(52) U.S. Cl.
USPC ............................................ 725/112; 725/37
(58) Field of Classification Search
USPC ........... 725/109–110, 112, 131, 53; 715/718, 715/206
See application file for complete search history.

(56) References Cited

U.S. PATENT DOCUMENTS

| | | | | | |
|---|---|---|---|---|---|
| 5,724,595 | A | * | 3/1998 | Gentner | 715/206 |
| 5,907,322 | A | * | 5/1999 | Kelly et al. | 725/51 |
| 5,961,603 | A | * | 10/1999 | Kunkel et al. | 709/229 |
| 6,326,982 | B1 | * | 12/2001 | Wu et al. | 715/718 |
| 7,181,756 | B1 | * | 2/2007 | Zigmond et al. | 725/43 |
| 2002/0144281 | A1 | * | 10/2002 | Taguchi et al. | 725/109 |
| 2004/0117831 | A1 | * | 6/2004 | Ellis et al. | 725/53 |
| 2005/0107985 | A1 | * | 5/2005 | Agrawal et al. | 702/186 |
| 2005/0278737 | A1 | * | 12/2005 | Ma et al. | 725/40 |

FOREIGN PATENT DOCUMENTS

| | | | |
|---|---|---|---|
| GB | 2370456 | * | 6/2002 |
| WO | WO 02/091228 A2 | | 11/2002 |
| WO | WO 02/091739 A2 | | 11/2002 |
| WO | WO 02091739 A2 | * | 11/2002 |

* cited by examiner

*Primary Examiner* — Vivek Srivastava
*Assistant Examiner* — Anthony Bantamoi
(74) *Attorney, Agent, or Firm* — Arthur J. Samodovitz; Roberts, Mlotkowski, Safran & Cole

(57) ABSTRACT

System, method and program for obtaining WWW information of interest to a user. The WWW information is related to a subject in a television, radio or other type of program which is broadcast. Before the program is broadcast, a plurality of documents are stored in a user device. Each of the documents has a plurality of categories. While the program is broadcast, a user indicates to the user device interest in a subject in the program currently being broadcast and selects one of the documents. In response, the user device displays the one document, and the user selects one of the categories in the one document. The user device determines a time that the user indicated the interest in the subject and transmits the time to a computer associated with the broadcast. In response, the computer correlates the time to an associated hyperlink referencing WWW information related to the subject, and transmits the associated hyperlink to the user device. In response, the user device correlates the hyperlink to the one category. Subsequently, the user device displays the hyperlink in association with the one category. If the user selects the hyperlink, the user device downloads and displays a web page or web file addressed by the hyperlink.

20 Claims, 12 Drawing Sheets

Document
(101)

CBC/Radio-Canada to Offer Queen's Golden Jubilee Gala Concert
Ottawa - CBC/Radio-Canada is proud to have been asked to be the exclusive broadcaster of the Queen's Golden Jubilee Gala, to take place on Thursday, October 10 from 8 to 10 p.m. at Roy Thomson Hall in Toronto. CBC/Radio-Canada is especially proud to broadcast the Gala on its French and English Radio and Television networks since this, our 50th anniversary of television in Canada, coincides with Her Majesty's Golden Jubilee.

To let as many Canadians as possible see this very special event, we are pleased to provide other over-the-air broadcasters with the CBC/Radio-Canada live, branded program package of the Golden Jubilee Gala television broadcast, provided it is broadcast in its entirety simultaneously with the CBC/Radio-Canada signal in any local time zone, and presented without commercial or other interruptions. Broadcasters are also permitted to use up to two minutes of excerpts for news purposes.

(701)

PROGRAM:

Mar"Golden Jubilee Gala Concert":
Debb http://www.cbc.radio-canada.ca/htmen/newsreleases/20021007.htm
Frank
     "The Hostess with the Mostes' In the Ball":
Dona http://www.seeklyrics.com/lyrics/Berlin-Irving/Hostess-With-The-Mostes-On-The-Ball-The.html (300)
     "Call Me Madam":
- "An  http://www.imagi-nation.com/moonstruck/albm92.html "God Bless America"
(703) The Hostess with the Mostes' on the Ball" from Call Me Madam
- "I Got Lost in his Arms" from Annie Get Your Gun
                                                    (702)
- "Let Yourself Go"
- "Steppin' Out with My Baby"
- "Mr. Monotony"
- "Old Fashioned Wedding" from Annie Get Your Gun
- "There's No Business Like Show Business" from Annie Get Your Gun
- "You're Just in Love" from Call Me Madam
- "Overture to Annie Get Your Gun"
- "Overture to Irving Berlin in Hollywood"
- "Easter Parade" from As Thousands Cheer
- Irving Berlin Medley

Figure 7

SYSTEM, METHOD AND PROGRAM FOR IDENTIFYING WEB INFORMATION RELATED TO SUBJECTS IN A PROGRAM BROADCAST

FIELD OF THE INVENTION

The present invention relates generally to computer systems, and more particularly to identifying Web information related to subjects in a program broadcast.

BACKGROUND OF THE INVENTION

The Internet including the World Wide Web ("WWW" or "Web") are well known today to provide access to information. The Internet is a global network of computers interconnected by network devices and using Transmission Control Protocol/Internet Protocol ("TCP/IP") or other such protocol. With the increasing size and complexity of the Internet, "navigators" or "navigation system" tools have been developed to help users find information on the network. The Web provides Internet-based navigation, information distribution and management, and a dynamic format for communicating on the Web. The Web integrates images, text, audio and video. A user on the Web, by means of a graphical user interface, can transparently communicate with different computers on the Internet, different system applications, and different information formats for files and documents including text, sound and graphics.

Currently, on-line systems on the Web offer a variety of different services to users, for example, private message services, electronic commerce, news, real-time games, access to electronic databases, electronic newsletters, business-to-business transactions, or job placement services. Even though such on-line services are now available, the Web remains essentially an open, multi-point to multi-point network where each user can select and retrieve different information from many different servers. Searching and finding relevant information is sometimes difficult, even for experienced users.

Some people who watch a television program want access to related complementary data, such as stocks and products prices, traffic and weather conditions, athletic records on Olympic Games or updated football scores. Other complementary information associated with a broadcast program may consist of the biography of a player in a football match, historical background on events cited during a news program or a recipe of an apple cake on a cooking show. Some consumers would like access to special services associated with advertised products such as product features, location of points of sales, discounts or coupons.

Some television broadcasts display and radio broadcasts state an Internet address to allow inquiries concerning the program that is broadcast. The user can then turn-on a computer and manually enter the Internet address. Other systems allow the exchange of digital information with a user watching the television by combining this information with the television signal e.g., teletext. However, such systems limit the access to a single information source and this source is entirely under the control of the broadcast or cable television operator.

It is also known to use a television as a terminal for accessing the Web. It is also known to integrate Web and TV by transmitting along with a video signal, a Web page showing for example statistics concerning a player during a sports game. The integration of Web and television, known as WebTV, has been made possible by the arrival of digital TV. In fact, many of the services associated with WebTV are available today on the Web. The data processing technology and the transmission technology used for the television and the Web are converging. Now TV sets are more and more "intelligent", and this intelligence requires upgrading of hardware for supporting the Web functions.

Unlike the multi-point to multi-point Web network, broadcast radio and television are primarily single-point to multi-point networks. The program is continuously broadcast in the same direction from a transmitter to multiple receivers, from a provider to multiple consumers. Every user receives the same content from a single broadcasting station.

Until recently, there was no way for producers of broadcast television or radio programs to create hyperlinks to access complementary information related to a broadcast program. The systems that are proposed require the transmission of the complementary information in a secondary signal, concurrently with the retransmission of the main program. Transmitting interactive data on interactive television (iTV) involves transmitting data along with normal program content. Two data channels are typically employed in an iTV connection. One is the vertical blanking interval, or VBI (lines at the top of the television raster that are not normally displayed on a television set), and the other is a "backchannel" (e.g., a telephone line). The VBI is typically used to send triggers and links. The backchannel is used to retrieve interactive content to be displayed on the television screen. EIA-608 standard describes data formatting, protocol and channel priority of data encoded in line 21 of the vertical blanking interval. Generally speaking, captions and data encoded in line 21 operate according to Transport A, as described in the ATVEF specification. An overview on the subject and standards is described in a document entitled "Interactive Television for Terrestrial Broadcasters", by Brad Gilmer, Broadcast Engineering, Sep. 1, 2000, incorporated by reference herein.

With these systems, the radio listeners or television viewers must be equipped with special decoder circuits to recover the complementary information. Proposals based on the transmission of means for identifying television programs or URLs associated with television programs during the vertical blanking interval (VBI) period require special decoders. The problem for providing interactive services to radio listeners or television viewers, is related to the fact that the users of the foregoing devices receive visual and/or oral information. The communication of complementary information to the users requires a specific transmitter on the TV or radio set and a specific receiver on the wireless user device. Without such a specific transmitter and receiver, it is impossible with conventional TV sets, to interact with broadcast programs to seek additional information or services.

International patent application WO 02/091228 (with corresponding European Patent EP1391111 and Taiwan Patent NI-182398 (TW0540235B) both assigned to IBM Corporation) entitled "System and method for enhancing broadcast programs with information on the world wide web" discloses a system and method for enabling a radio listener or a television viewer to access complementary information related to a broadcast program received in real-time without using special receivers, decoders or transmitters for transmitting information from the broadcast program receiver to the user. A person receives a broadcast program, and selects one or more topics drawing his or her attention, to immediately or later access additional information related to these topics from the Word Wide Web. The system is based on the synchronization of the local times between users and transmitters according to a same universal-time, so that the flow of information transmitted and received is always synchronized, independently of the relative positions of the users receivers and transmitters. The synchronization is done referring to a universal time such as the Global Positioning System Time GPS-time, the Global Orbiting Navigational Satellite System GLONASS time or another suitable universal time based on a satellite system. The GPS or GLONASS receivers are connected or integrated to the broadcasting stations. At the receiver side, GPS or GLONASS receivers are integrated or connected to devices e.g., Personal Computers, wearable computers, Personal Digital Assistants PDAs, cell phones or onboard mobile computers that can be independent or separate from the radio or television receivers. The system is also based on a plurality of hyperlinks defined for a given duration corresponding to the retransmission of a program. The hyperlinks are associated with the transmitted information. The hyperlinks can be retrieved, selected and activated by radio listeners or television viewers during the time intervals for which they have been defined. The referenced patent application enables a user to create lists named "Selections Tables" of interesting topics from the received broadcast programs and then to access multimedia information or services related to these topics by connecting to the Internet network.

An object of the present invention is to enable a viewer of a television program or a listener of a radio program to obtain additional information about the program.

SUMMARY OF THE INVENTION

The present invention resides in a system, method and program for obtaining WWW information of interest to a user. The WWW information is related to a subject in a television, radio or other type of program which is broadcast. Before the program is broadcast, a plurality of documents are stored in a user device. Each of the documents has a plurality of categories. While the program is broadcast, a user indicates to the user device interest in a subject in the program currently being broadcast and selects one of the documents. In response, the user device displays the one document, and the user selects one of the categories in the one document. The user device determines a time that the user indicated the interest in the subject and transmits the time to a computer associated with the broadcast. In response, the computer correlates the time to an associated hyperlink referencing WWW information related to the subject, and transmits the associated hyperlink to the user device. In response, the user device correlates the hyperlink to the one category. Subsequently, the user device displays the hyperlink in association with the one category. If the user selects the hyperlink, the user device downloads and displays a web page or web file addressed by the hyperlink.

In accordance with other features of the present invention, a system, method and computer program enables a user observing a radio or television program broadcast, by means of a stand-alone user device (i.e., not connected to a broadcast program receiver or to a communications network) to select topics of interest in the broadcast programs, select electronic documents stored in the user's device, e.g., a concert program, a map of a town's region, and link categories selected from the electronic documents to the topics selected from the broadcast programs. Once one or several topics from broadcast programs have been selected and have been associated with the corresponding categories selected from the documents, the user's device connects to a communications network e.g., to the Internet network, to retrieve from servers connected to the communications network, hyperlinks to multimedia information or services related with the topics selected from the broadcast programs. Then, the user's device associate the received hyperlinks with the corresponding categories in the electronic documents stored in the user's device, and activates the hyperlinks from the categories to have access to the multimedia information or services related to the categories.

BRIEF DESCRIPTION OF THE DRAWINGS

FIG. 7 illustrates the step of associating with a topic selection object, the hyperlinks list received from the broadcast channel server, according to the present invention.

DETAILED DESCRIPTION OF THE PREFERRED EMBODIMENTS

Figure 1:
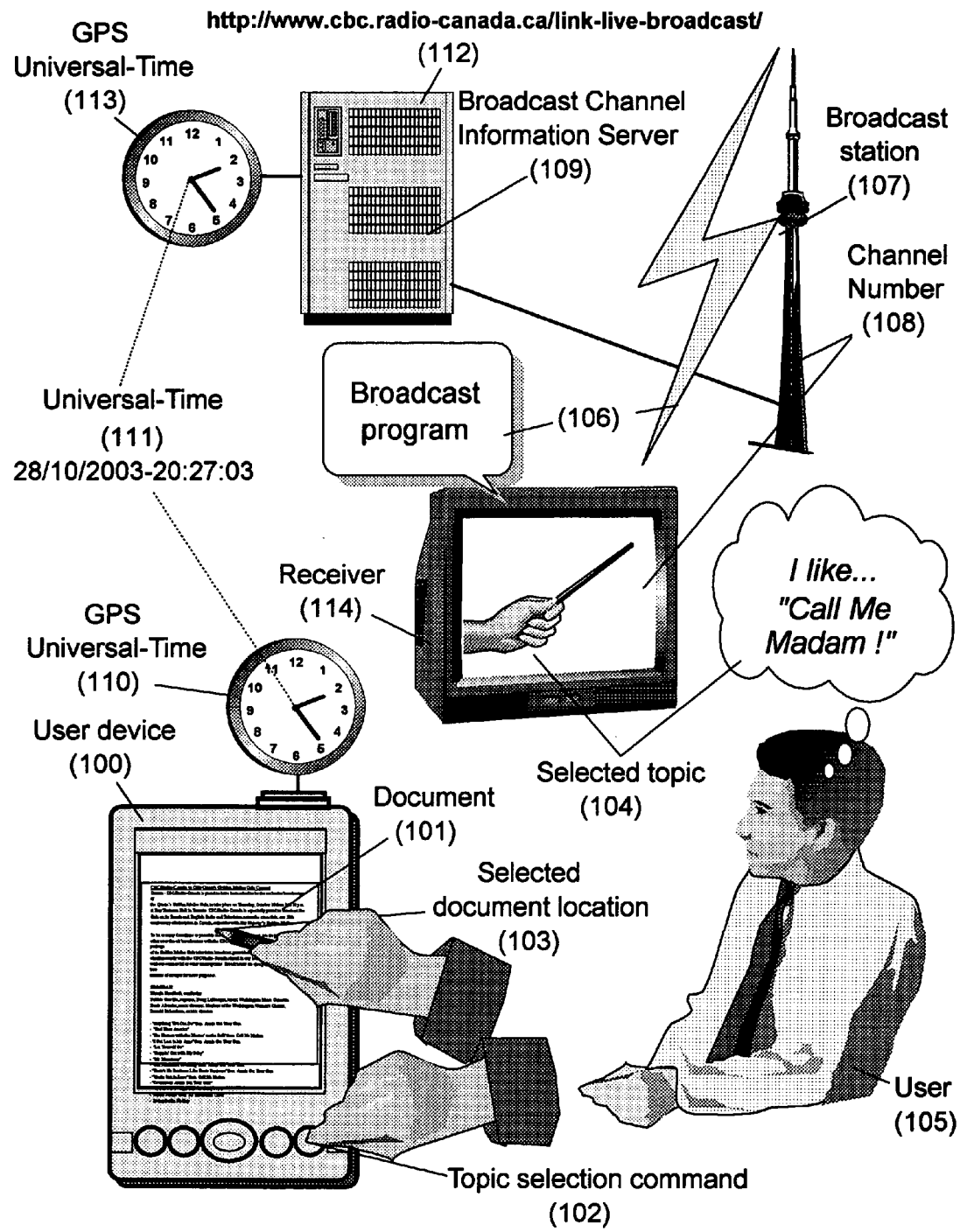
FIG. 1 shows the main components of the invention for enabling a television viewer to select an interesting topic from a broadcast program, and linking an object in a electronic document to information or services related to the selected topic.

As shown in FIG. 1, the present invention is directed to a system, method and computer product for enabling a radio listener or a television viewer 105 of a radio or television broadcast program 106 received in real-time from a broadcast station 107, by means of a stand-alone user device 100 i.e., not connected to a network 620 and not connected to the broadcast program receiver 114:

to manually select 102 interesting topics 104 in the broadcast programs 106 e.g., songs played during a broadcasted concert, broadcast news about public events in a town;

to select and display electronic documents 101 e.g., a concert program, a map of a town, an agenda; and to link objects or points 103 selected on the electronic documents 101 displayed on the user device 100 to the topics selected 104 by the user in the broadcast programs 106 e.g., to link the title of a song written on a concert program to the broadcast song; to link the location of a town represented on a digital map to a broadcast program concerning a public event performed in this town.

As shown in FIG. 1, when one or a plurality of topics 104 in the broadcast programs 106 have been selected and linked by the user to objects or points 103 in the electronic documents 101, the user's device 100 connects 650 to a communications network 620 e.g., to the Internet network:

to retrieve from broadcast channel servers 109, 612, 622, hyperlinks 640 to multimedia information or services related to the topics 104 selected from the broadcast programs 106 e.g., hyperlinks to web pages related to lyrics, author or records of a song; hyperlinks to web pages related to public services, history or shopping centers of a town, and to automatically associate the received hyperlinks 640 with the corresponding documents objects or points 103, in order to create hyperlinks from selected documents objects or points 103 to information or services related with the topics 104 selected from the broadcast programs 106 e.g., hyperlinks from the title of a song written on a concert program, to the song lyrics, the author or records; hyperlinks from a place in a town represented on a digital map, to information related to the public services, the history or the shopping centers of this town.

Figure 8:
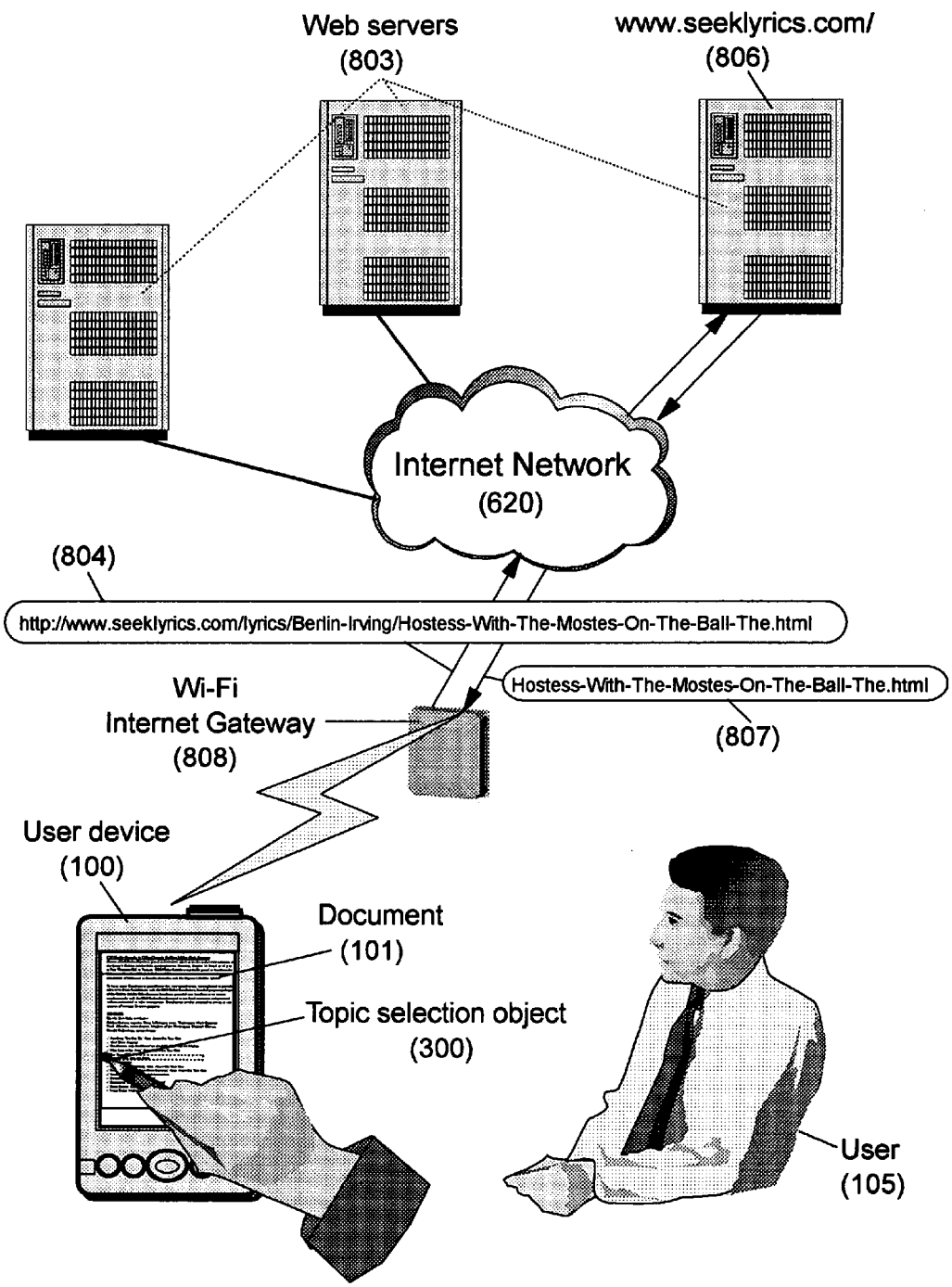
FIG. 8 illustrates how a user, by selecting a topic selection object created on an electronic document, can access to multimedia information on servers connected to a network, according to the present invention.
Figure 9:
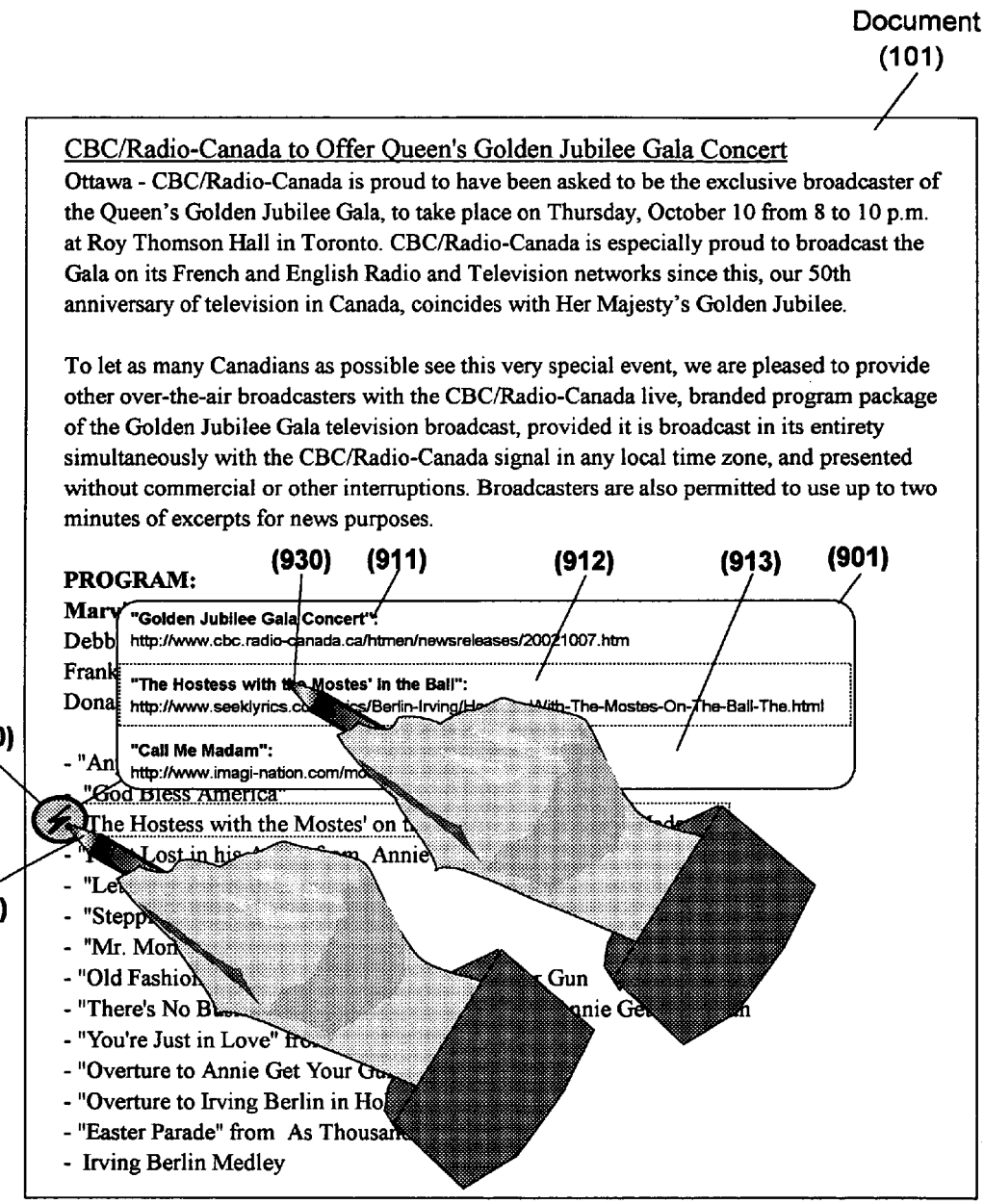
FIG. 9 shows in detail how a user selects a topic selection object on an electronic document and then selects and activates a hyperlink from an associated hyperlink list, according to the present invention.

Also, as illustrated by FIGS. 8 and 9, when hyperlinks between the selected documents objects or points 103 and information or services related to topics 104 selected from broadcast programs 106 have been created, the user's device 100 connects 808 to the communications network 620 e.g., to the Internet network. The present invention enables:

to select an electronic document 101 and to display hyperlinked objects or points 300 defined on the electronic document;

to select 920 anyone of the document hyperlinked objects or points 300;

to display the one or plurality of hyperlinks 901 associated with the selected document object or point 300; and to select 920 and activate anyone of the hyperlinks 930, 804 to have access to multimedia information or services 807 on servers 803 connected to the network 620.

Synchronization According to a Universal-Time

As shown in FIG. 1, the present invention is based on synchronization according to a same universal-time 111 such as for example, the Universal Time Coordinated UTC or the Global Positioning System GPS time of the local time 113 clock used in the broadcast station 107, and the local time 110 clock used in the user device 100.

According to this principle, the flow of information transmitted 106 by the broadcast station 107 and the flow of information received 104 and recorded 102 by the users devices 100 are permanently synchronized, independently of the relative position of the broadcast station 107 and the users 105. The local time 110 at which the selections 102 of interesting topics 104 received from a broadcast program 106 are entered on the users' devices 100, can be compared with the local time 113 used by the broadcast station 107. It is then possible to identify which topics or sequences 104 have been broadcast at the time 110 where the selections 102 have been made by the users.

Hyperlinks

Figure 2:
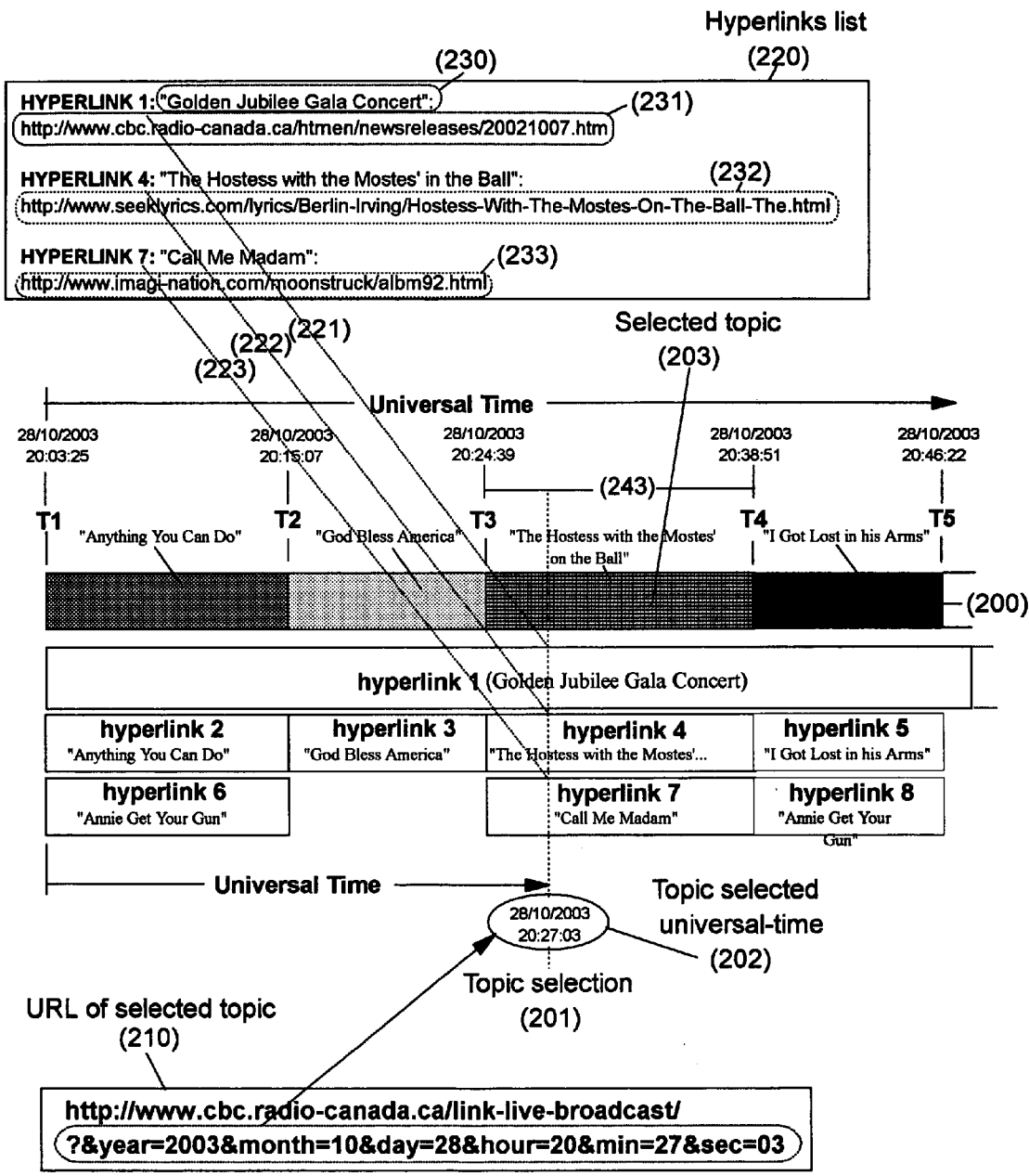
FIG. 2 illustrates a process of synchronizing broadcast programs according to a universal-time and shows how hyperlinks are defined for various topics in these broadcast programs, according to the present invention.

As shown in FIG. 2, the present invention is also based on the definition of hyperlinks 221, 222, 223 associated with particular topics or sequences 203 of the broadcast programs 106. During the broadcasting of a program 106, hyperlinks 221, 222, 223 and universal-time intervals 243 associated with particular topics and sequences 203, are logged by the broadcast station 107 on a Broadcast Channel Information Server 109. For each topic or sequence 203, the Broadcast Channel Information Server 109 keeps a record of the universal-time interval 243 during which this topic or sequence has been broadcast, and an associated record 220 comprising a list of hyperlinks names and URLs 231, 232, 233 associated with this topic or sequence 203.

FIG. 2 also shows how a plurality of hyperlinks 221, 222, 223 can be logged and selected at the same time 202. The hyperlinks list 220 referencing hyperlinks 221, 222, 223 corresponding to the selections 203 made by the users e.g., by pressing a reserved key 102 on the users devices 100, are retrieved from the Broadcast Channel Information Server 109 because the broadcast station 107 and user's devices 100 are always synchronized.

In a particular embodiment of the invention, the synchronization is done referring to a universal time such as the Global Positioning System Time GPS-time, the Global Orbiting Navigational Satellite System GLONASS time or another suitable universal time based on a satellite system. The GPS or GLONASS receivers 113 are connected to or integrated in the broadcasting stations 107. At the receiver side, GPS or GLONASS, receivers 110 can be connected to or integrated in the user's devices 100.

As illustrated in FIG. 2, the present invention is based on a system in which programs 200 are broadcast according to a universal time 113. FIG. 2 shows how topics 203 in the broadcast program 200 and hyperlinks 231, 232, 233 are associated and how, when transmitters and receivers are synchronized, the hyperlinks 221, 222, 223 can be selected 201 by radio listeners or television viewers during predefined time intervals 243.

As illustrated also in FIGS. 1 and 2, the Broadcast Station 107 e.g., a TV station receives a timing signal from a universal-time receiver 113 e.g., from a GPS receiver delivering GPS Time signals. During the broadcasting of a program 106, the Broadcast Station or transmitter 107 updates a database on a Broadcast Channel Information Server 109 i.e., a server linked to the transmitter. This database comprises universal time intervals 243 for instance GPS-time intervals during which hyperlinks 221, 222, 223 between the topics 104, 203 on the broadcast program 106, 200 and resource addresses URLs: Uniform Resource Locators 231, 232, 233 of Web pages are "alive" and can be retrieved by radio listeners or television viewers 105. Each hyperlink 223 logged on the Broadcast Channel Information Server 109, is tagged with a universal-time interval 243 e.g., with the GPS Time interval corresponding to the broadcast of a topic or sequence 203.

Linking Selected Locations on a Document to Topics Selected from a Broadcast Program When a person 105 listens to or watches a broadcast program 106, some topics may draw his or her attention. This person may wish to obtain complementary information concerning these particular topics. To that aim, the present invention discloses a method for use on a user device 100, for creating a link from a selected point or location 103 of an electronic document 101 previously selected by the user, to a topic 104 chosen by the user from a broadcast program. The object of this link is to receive, immediately or at a later time, additional information or services related to the topic selected from the broadcast program.

Channel Table

As a preliminary step, for enabling a user 105 to select one or several topics of interest 104 in a program 106 received among a plurality of different broadcast channels 108, a Channel Table, like the one illustrated hereinafter, is created beforehand and stored on the user device 100. This Channel Table is filled with information related to the broadcast channels that have been previously programmed on the receiver 114. The Channel Table stores information required to access from the user device 100 when connected to a communications network 620, a plurality of Broadcast Channel Information Servers 109, 612, 622 throughout the network. The Channel Table comprises a list of channel numbers e.g., Channels: 03, 25, 17, 33, 72 and, for each channel number e.g., Channel 03: the name of the broadcasting station e.g., CBC/Radio-Canada; and the resource address for example, the URL 112 of the Broadcast Channel Information Server 109 associated with said channel e.g., http://www.cbc.radio-canada.ca/link-live-broadcast/

The information concerning the Channel Table is previously recorded on the user device 100 and can be provided by any of the many information sources available today e.g., by TV or radio operators, from newspapers, the Web, etc.

| CHANNEL | BROADCAST STATION | CHANNEL INFORMATION SERVER URL |
|---|---|---|
| 03 | CBC/Radio-Canada | http://www.cbc.radio-canada.ca/link-live-broadcast/ |
| 25 | TV2 | http:/www.tve2_link.com/link-live-broadcast/ |
| 17 | TV5 | http:/www.tve5_link.com/link-live-broadcast/ |
| 33 | CNN-NEWS | http:/www.cnn_news_link.com/link-live-broadcast/ |
| 72 | NBC | http:/www.nbc_link.com/link-live-broadcast/ |

Channel Table

Linking Selected Locations of a Document to Selected Topics

Figure 10:
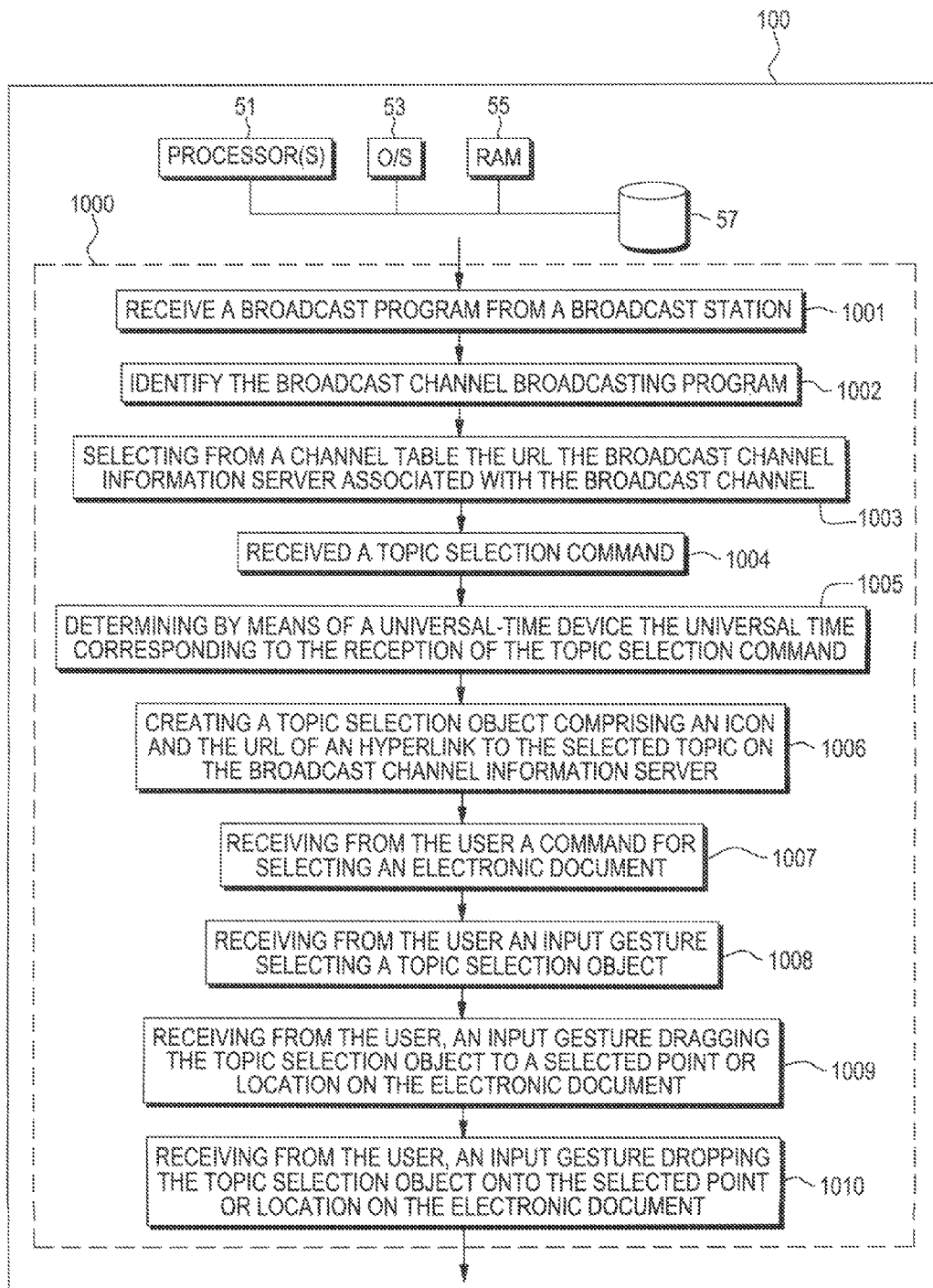
FIG. 10 is a flowchart illustrating a program in a user device for linking a user to a location selected on a document to a topic selected from a broadcast program, according to the present invention.

FIG. 10 illustrates a computer program 1000 on a user device 100, for enabling a listener 105 of a radio program or a viewer of a TV program 106, to select a topic of interest during the broadcasting of this radio or TV program, and to create a link from a location (or object, such as a word) 103 selected by the listener or the viewer on a document 101, to the selected topic 104. Program 1000 is stored on tangible storage device 57 for execution by one or more processors 51 via RAM 55 using operating system 53. Program 1000 identifies the server associated with the channel broadcasting the radio or TV program, by the following program steps:

1001—receiving a broadcast program 106 from a broadcast station 107;

1002—identifying the broadcast channel 108 broadcasting the program 106; and

1003—selecting from a Channel Table i.e., a bookmarks list stored on the user device 100 the resource address URL 112 of a server 109 associated with the broadcast channel 108.

For each interesting topic 104 selected by the user 105 from the broadcast program 106, the user and program 1000 create a topic selection object on an electronic document, by the following program steps:

1004—receiving from the user 105, a topic selection command 102, 201;

1005—determining by means of a universal-time device 110, the universal time 111, 202—corresponding to the reception of the topic selection command 102;

1006—creating a topic selection object 300 comprising:

an icon 301; and the resource address URL 302 of an hyperlink to the selected topic 203 on the broadcast channel information server 109;

using the resource address URL 112 of the broadcast channel information server 109 and the universal time 111, 202 of the topic selection command 102;

1007—receiving from the user 105, a command for selecting an electronic document 101;

1008—receiving from the user, an input gesture 401 selecting a topic selection object 300;

1009—receiving from the user, an input gesture dragging 402 the topic selection object 300 to a selected point or location 403 on the electronic document 101;

1010—receiving from the user, an input gesture dropping 503 the topic selection object 300 onto the selected point or location 504 on the electronic document 101.

Selection of a Topic in a Broadcast Program

FIG. 1 shows how, when a user 105 perceives a topic of interest 104 in a broadcast program 106, this user can immediately select this topic e.g., by pressing a reserved key on the user device 100. The user selection results in the generation of a "get-new-topic" command or topic selection command 102. In FIG. 1, the user device 100 and the broadcast program receiver 114 are independent and separate.

FIG. 2 illustrates how, when a topic selection command 102, 201 is received, the user device 100 immediately determines the universal-time of the selection e.g., 28/10/2003-20:27:03 202 by means of a universal-time receiver e.g., from GPS receiver 110. By means of the channel number e.g., channel number 03 selected on the broadcast program receiver 114, the user identifies in the Channel Table stored on the user device 100:

the Broadcast Station e.g., CBC/Radio-Canada to which the broadcast program receiver 114 is tuned, and the address URL e.g., http://www.cbc.radio-canada.ca/link-live-broadcast 112 of the associated Broadcast Channel Information Server 109.

The universal-time e.g., GPS Time: 28/10/2003-20:27:03 corresponding to the topic selection command, and the address URL e.g., http://www.cbc.radio-canada.ca/link-live-broadcast/ of the Broadcast Channel Information Server 109 are then associated to generate the address URL, e.g., http://www.cbc.radio-canada.ca/link-live-broadcast/?&year=2003&month=10&day=28&hour=20&min=27&sec=03 210 required to access from the Broadcast Channel Information Server 109, a list of hyperlinks 220 related to the topic 104 selected by the user 105 from the broadcast program 106, 200.

The use of a common universal-time system 110, 113 between the broadcast station 107 and the user device 100, allows to precisely synchronize the various topics of the broadcast program 200 time intervals during which program topics are transmitted: T1, T2, T3, T4, T5 recorded in the Broadcast Channel Information Server 109 with the time of the selections 102, 202 made by the user 105 and detected by the user device 100. Therefore, the hyperlinks 221, 222, 223, active on the Broadcast Station 107 when the selections 102, 201 of topics 104 are performed remotely by users 105, can be identified without any error, independently of the relative location of the Broadcast Stations and listeners or viewers.

Creation of a Topic Selection Object on a Document

Figure 3:
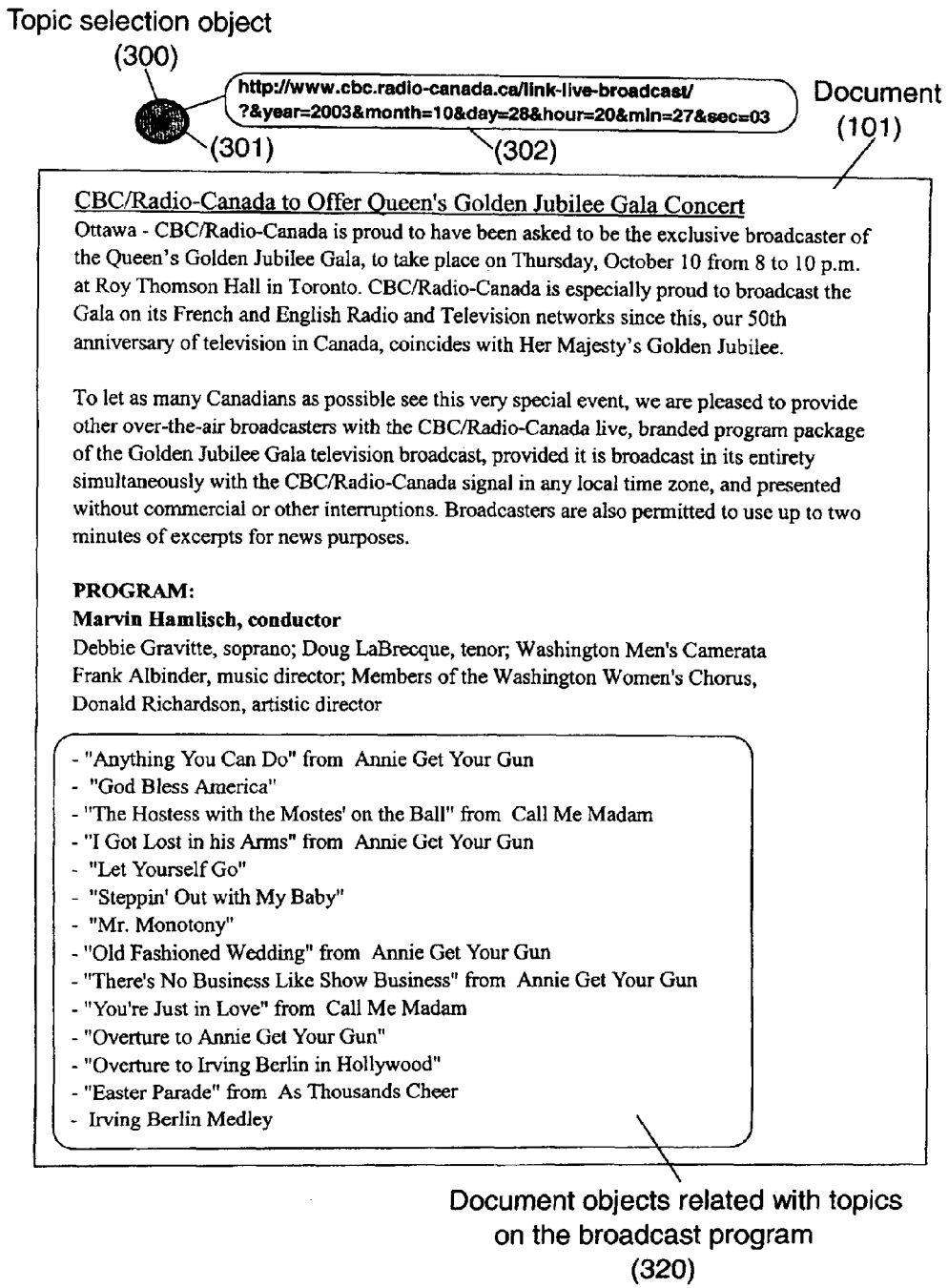
FIG. 3 shows an electronic document comprising references to a broadcast program or topics related to a broadcast program.

FIG. 3 illustrates how, according to the present invention, each time the user 105 selects a new topic 104 in a broadcast program 106, a topic selection object 300 represented by an icon 301 is automatically created and displayed on the user device 100. The resource address URL of the selected topic 210, 302 is also automatically associated as an attribute with this object 301. FIG. 3 also illustrates how the user 105 selects a document e.g., the document entitled: "CBC/Radio-Canada to Offer Queen's Golden Jubilee Gala Concert" 101 somehow related to the topic e.g., the song entitled "Call Me Madam" 104 previously selected from the broadcast program. The selected document 101 is displayed on the same user device, along with the icon of the newly created topic selection object 301. The selected document 101 can also comprise references or objects e.g., figures, pictures, words, paragraphs 320 related to the topics received on the broadcast program 106.

Dragging and Dropping a Topic Selection Objects on a Document

Figure 4:
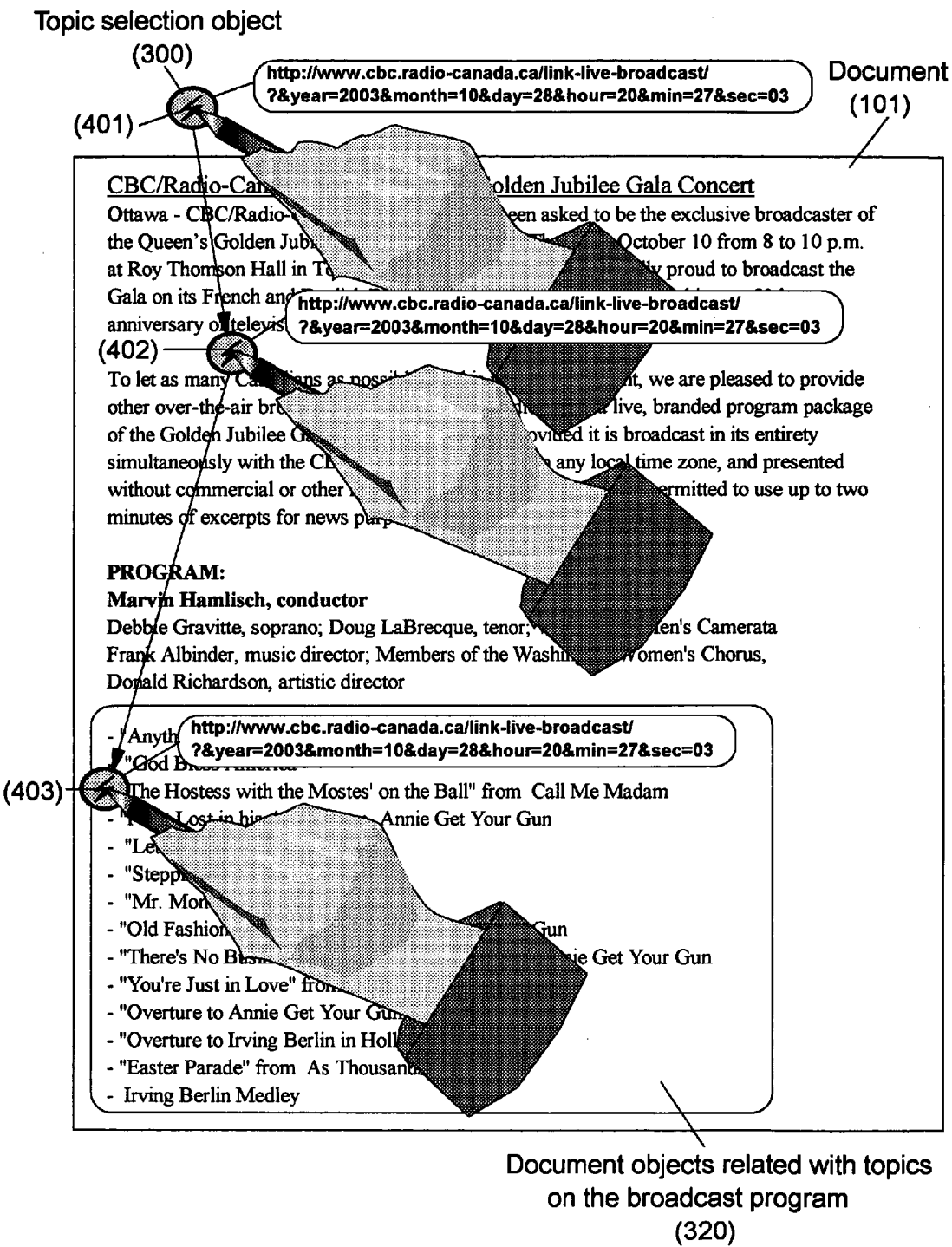
FIG. 4 shows how a user, after selecting a topic in a broadcast program, drags a new topic selection object to a selected location on the electronic document, according to the present invention.
Figure 5:
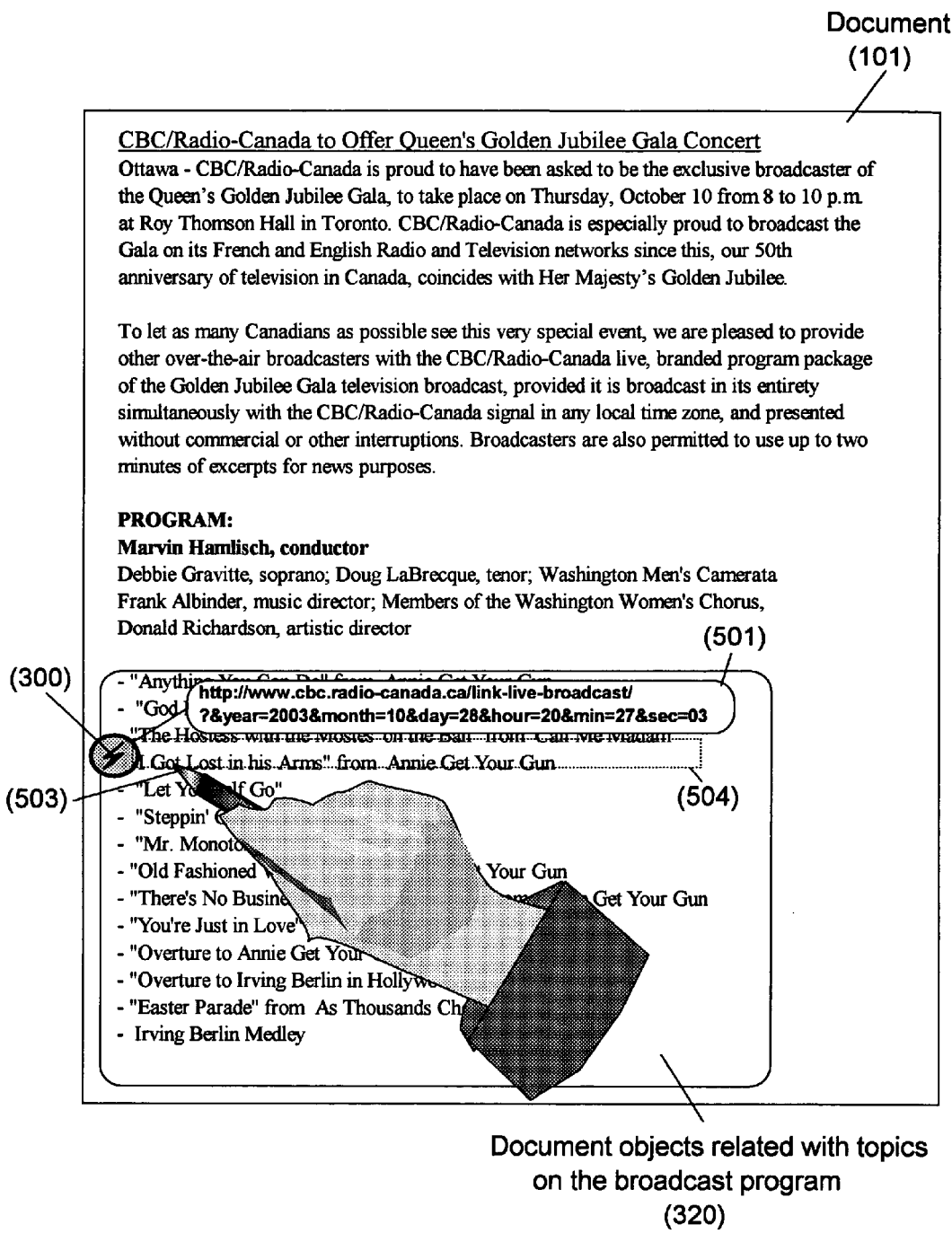
FIG. 5 shows how a user drops a topic selection object on a selected location on the document, according to the present invention.

FIGS. 4 and 5 illustrate how, according to present invention, once the user has selected a topic 104 in a broadcast program 106, and has selected an electronic document 101, he or she associates this topic with this document. By pointing, e.g., by means of any type of pointing device on the icon of the created topic selection object 300, the user selects 401, drags 402, 403, and drops 503 the topic selection object into a selected location 504 of the document, preferably into the vicinity of a document item, e.g., a word or a phrase or a document location e.g., a point in a digital map somehow related to the topic selected from the broadcast program.

In the example illustrated by FIGS. 4 and 5, the user selects, drags and drops the topic selection object 300 related to the selection of the song: "Call Me Madam" received from a broadcast program 106, to a point on the electronic document entitled "CBC/Radio-Canada to Offer Queen's Golden Jubilee Gala Concert". The point on the electronic document is chosen in connection with the program of the live concert during which the selected song is broadcast. In the present example the point selected by the user to drop and therefore, to associate the icon 300 of the topic selection object, i.e., the icon associated to the song entitled "Call Me Madam", corresponds to the entry 504 of the song title on the program of the concert, i.e.:

"The Hostess with the Mostes' on the Ball" from Call Me Madam Therefore, the location where the icon of a topic selection object is placed on the document, enables the user to conceptually relate the document items displayed on the vicinity of the icon to the topic selected from the broadcast program.

User Device and Associated Computer Program

For implementing the method for linking selected items or locations 103 of a document 101 to selected topics 104 received from a broadcast program 106, the present invention includes a computer program 1000 executing in a user device 100 including or connected to an universal-time receiver e.g., a GPS receiver and antenna 110. The computer program comprises instructions for:

a receiving a user input specifying the resource address URL 112 of a broadcast channel information server 109;

receiving a user input 102 indicating the selection of a topic 104 in the broadcast program 106;

receiving from a universal-time device 110, the universal time 111 corresponding to the selection 102;

creating a topic selection object 300 made of:

an icon 301 and the resource address URL 302 of an hyperlink to the selected topic 203 on the broadcast channel information server 109;

by means of the resource address URL 112 of the broadcast channel information server 109; and the universal time 111, 202 of the selection:

receiving a user input for selecting an electronic document 101;

receiving a user input 401 for selecting a topic selection object 300;

receiving a user input 402 for dragging the topic selection object 300 to a selected document location 403;

receiving a user input for dropping the topic selection object 300 onto a selected document location 504.

Retrieving from a Document Hyperlinks Associated with Topics Selection Objects

Figure 11:
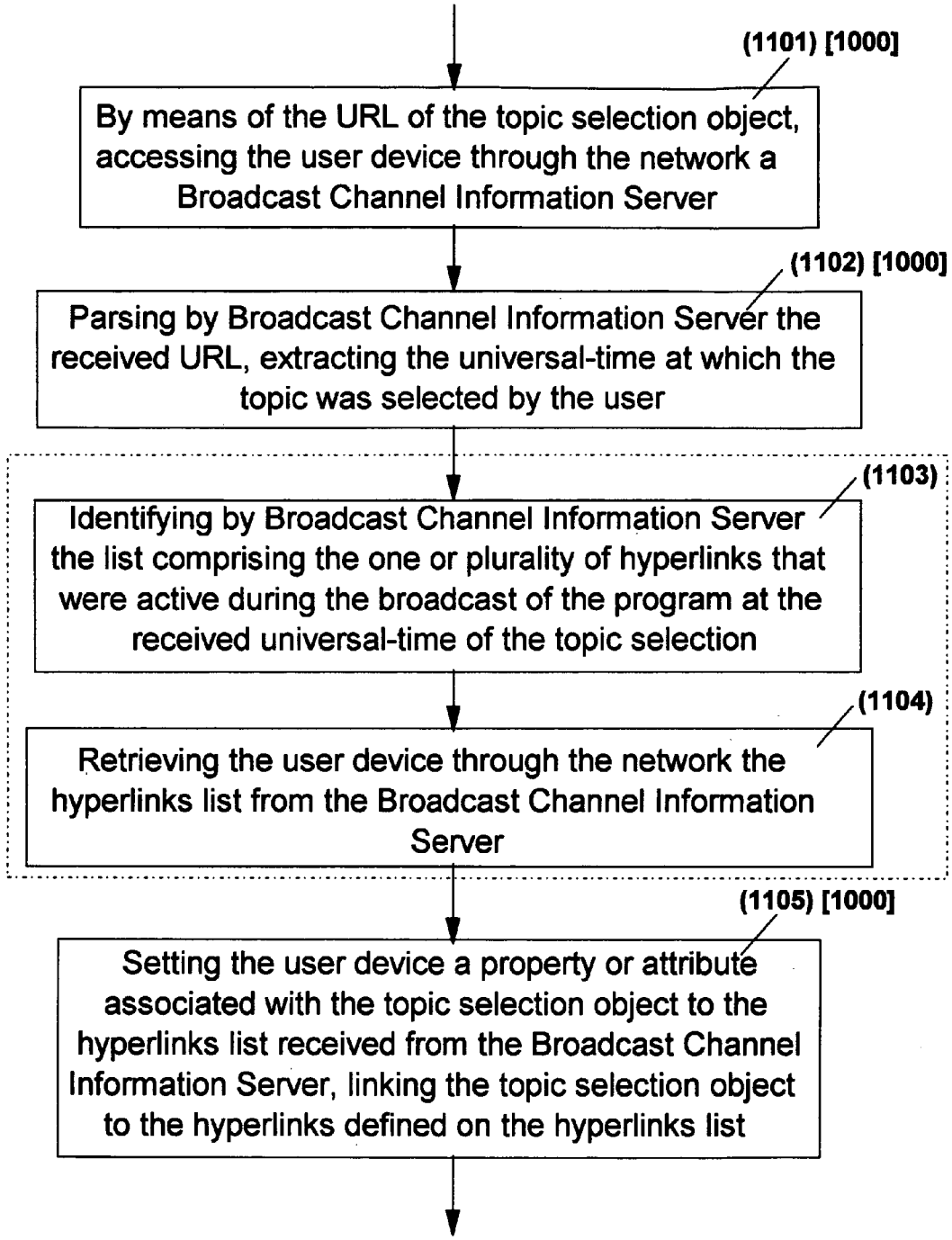
FIG. 11 is a flowchart of other steps of the program of FIG. 10 in the user device and steps of another program in a server for retrieving hyperlinks associated with topics selection objects created on a document from topics selected by the user from broadcast programs, according to the present invention.

After the user has selected one or a plurality of interesting topics 104 from one or a plurality of broadcast programs 106 and has linked the corresponding topic selection objects 300 to selected positions 103, 504 on the electronic documents 101, hyperlinks are automatically created from the topic selection objects 300 to information or services related to the corresponding selected topics 104, 203. To that aim, the present invention discloses that computer program 1000, on user device 100 connected to a communications network e.g., to the Internet network 620, has other program steps for retrieving from Broadcast Channel Information Servers 109, 612, 622, hyperlinks 640, 220 to multimedia information or services related to the topics 104, 203 selected from the broadcast programs 106, and for associating the retrieved hyperlinks 640, 220 with the corresponding topic selection objects 300. As shown in the FIG. 11, for each topic selection object 300 defined on the electronic document 101, computer program 1000 on user device 100 includes program steps

1101, 1104 and 1105, and computer program 1102, 1103 on server 109, perform the following steps:

- 1101—The user device accesses 650 through the network 620 a Broadcast Channel Information Server 109 by means of the resource address URL 501, 630 of the topic selection object 300;
- a 1102—The Broadcast Channel Information Server 109 parses the received resource address URL 630, 210, and extracts the universal-time 202 at which the topic was selected by the user 105;
- 1103—The Broadcast Channel Information Server 109 identifies the list 220 comprising the one or plurality of hyperlinks 221, 222, 223 that were active during the broadcast of the program 106 at the received universal-time 202 of the topic selection. The hyperlinks list 220 comprises, for each hyperlink:
  - a name or short description 230 of the multimedia information or service accessible through the network 620;
  - the resource address URL 231 for accessing within the network 620 the multimedia information or service;
- 1104—The user device 100 retrieves through the network 620 the hyperlinks list 220, 640 located on the Broadcast Channel Information Server 109;
- 1105—The user device sets a property or attribute associated with the topic selection object 300 to the hyperlinks list 701, 220 received from the Broadcast Channel Information Server 109, thereby linking the topic selection object 300 to the hyperlinks 221, 222, 223 defined on the hyperlinks list 701, 220.

Retrieving Hyperlinks

Figure 6:
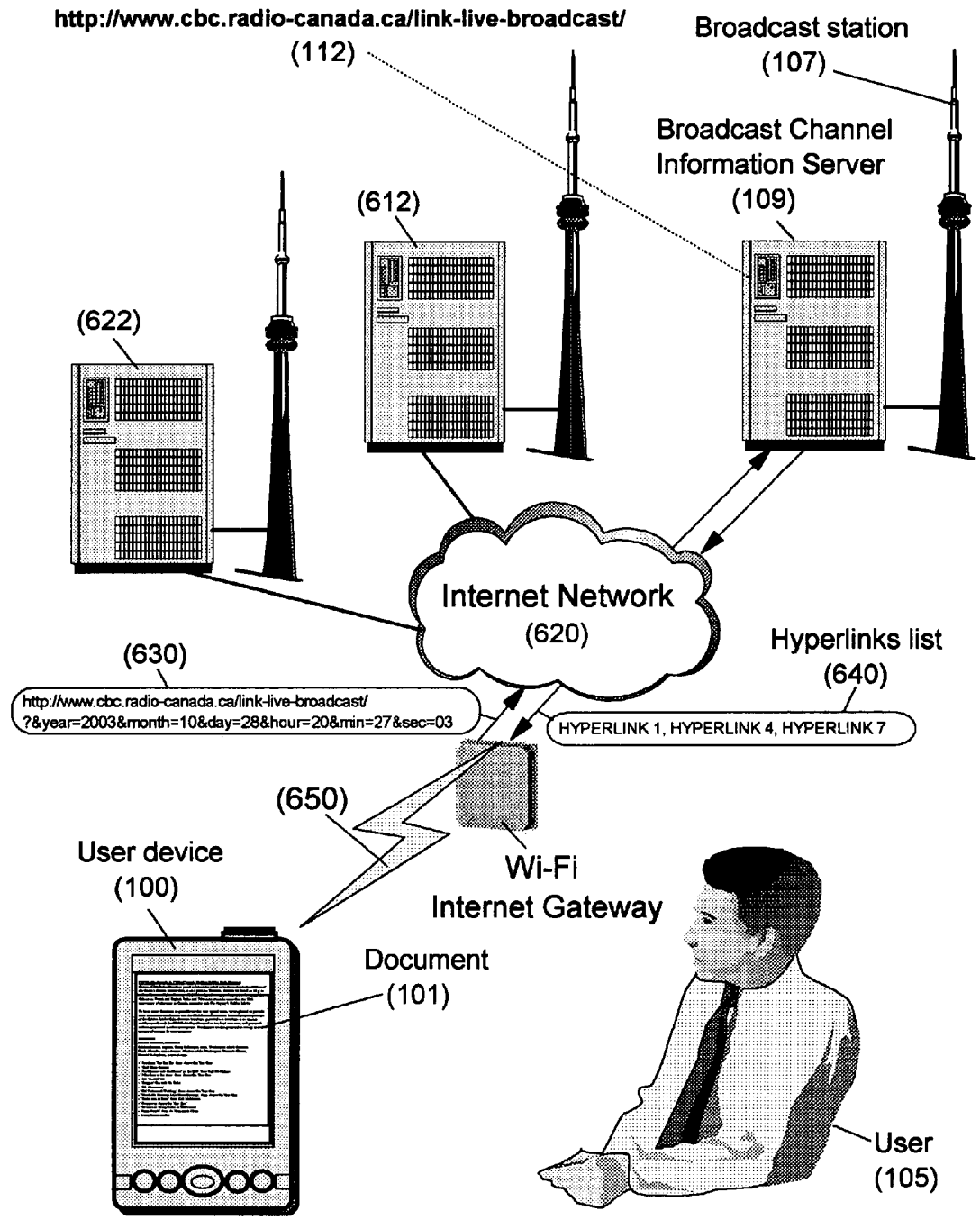
FIG. 6 illustrates the process of retrieving from broadcast channel servers hyperlinks between topic selection objects created on a document and multimedia information or services, according to the present invention.

FIG. 6 shows how, using the resource address URL 630, 501 of the topic selection object, e.g.,
http://www.cbc.radio-canada.ca/link-live-broadcast/
?&year=2003&month=10&day=28&hour=20&min=27&sec=03,
the user device 100 sends a request to the Broadcast Channel Information Server 109 to retrieve the one or plurality of hyperlinks 640, 220 related to the broadcast topic 104 selected by the user 105 from the broadcast program 106 received from the Broadcast Station 107 at the universal-time 202, 111 corresponding to the selection 201, 102 made by the user.

As illustrated also by FIG. 2, when a request 210, 630 through the network 620 is received from a user device 100, the Broadcast Channel Information Server 109, using the selection universal-time e.g., 28/10/2003-20:27:03 202 comprised in the request 210, identifies in a database on this server the one or plurality of hyperlinks 231, 232, 233 that were active at the universal-time of the selection 202. The information related to the identified hyperlinks including for each hyperlink the hyperlink description or short name 230 and address or URL 231 is extracted as an hyperlinks list 220 from the database and transmitted through the network 620 to the user device 100.

Setting an Attribute to the Hyperlink List

FIG. 7 shows how, after retrieving from Broadcast Channel Information Server 109 on the user device 100 the hyperlinks list 220, 640, a property or attribute associated with the topic selection object 300 is set to the hyperlinks list 701, 220, thereby linking the topic selection object 300 to the hyperlinks 221, 222, 223 defined on the hyperlinks list 701, 220.

Highlighting Preexisting Document Objects

In an particular embodiment of the invention, the method can be adapted to further include the step of determining whether or not the location 703 of topic selection object 300 references a preexisting document object e.g., a word, or a phrase 702, and if so marking e.g., highlighting, underlining the preexisting document object 702 and setting a property associated with it to the hyperlinks list 701, 220 received from the Broadcast Channel Information Server 109, thereby linking the preexisting document object 702 to the hyperlinks 221, 222, 223 defined on the hyperlinks list 701.

User Device and Associated Computer Program

For implementing the method of retrieving hyperlinks between topics selections objects 300 created on a document 101, and multimedia information or services, associated with topics 104 selected by a user from broadcast programs 106, the system according to the present invention includes a first computer program residing on the user device 100 and a second computer program residing on the Broadcast Channel Information Server 109, the user device and the Broadcast Channel Information Server being both connected to a communications network 620. The computer programs comprise instructions to:

for each topic selection object 300 defined on the document 101:
- use the URL 501, 630 of the topic selection object 300 to access through the network 620 a Broadcast Channel Information Server 109;
- parse by Broadcast Channel Information Server 109 the received URL 630, 210 to extract the universal time 202 of the selected topic;
- identify by Broadcast Channel Information Server 109 the list 220 of the one or plurality of hyperlinks 221, 222, 223 that were active during transmission of broadcast program 106 at the topic selection universal-time 202;
- retrieve through the network 620 on the user device 100 the hyperlinks list 220, 640 from Broadcast Channel Information Server 109;
- set a property associated with the topic selection object 300 to the hyperlinks list 701, 220 received from the Broadcast Channel Information Server 109, thereby linking the topic selection object 300 to the hyperlinks 221, 222, 223 defined on the hyperlinks list 701.

Method for Accessing Information or Services from Topic Selection Objects

Once the radio listener or television viewer 105 has:
- selected one or a plurality of topics of interest 104 from broadcast programs 106,
- linked the corresponding topics selection objects 300 to the selected positions 103, 504 on the electronic documents 101,
- retrieved the hyperlinks lists 220, 640 comprising hypelinks names 230 and URLs 231 corresponding to the selected topics 104 from the Broadcast Channel Information Servers 109, and
- associated 701 the hyperlink lists with the corresponding topic selection objets 300 on the documents 101 stored on the user device 100, the radio listener or television viewer 105 can:
- select 920 any topic selection object 300,
- monitor the hyperlinks list 901 of this object 300, and
- select and activate 930 any retrieved hyperlink 912 to access multimedia information or service related to the corresponding selected topic 104, 912. The information or services are located on servers 803 connected to the network 620 e.g., Internet Web servers.

Figure 12:
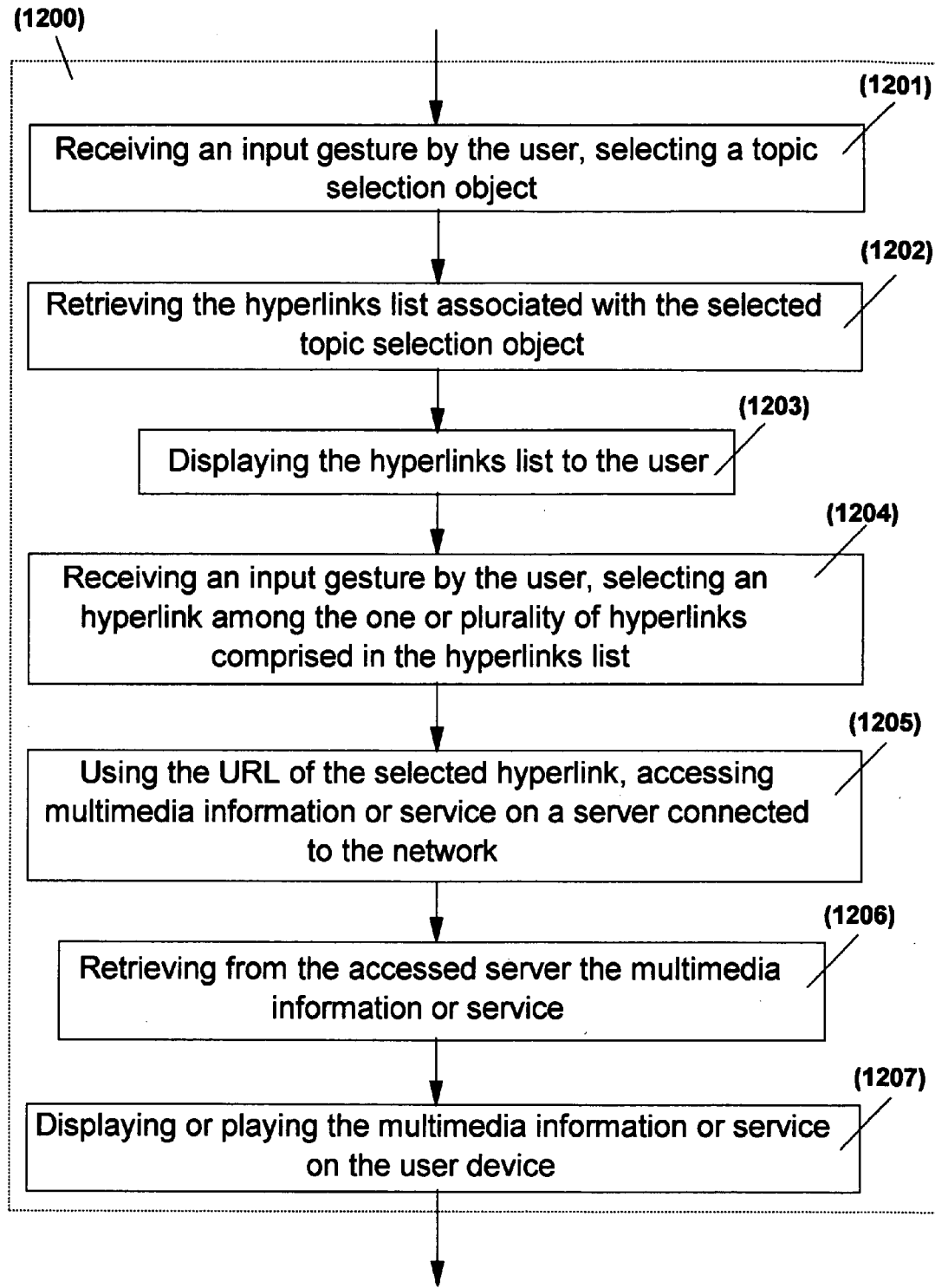
FIG. 12 is a flowchart of other steps of the program of FIG. 10 in the user device for enabling a user to access from a topic selection object defined on a document related multimedia information or services from a server connected to a network, according to the present invention.

FIG. 12 illustrates other steps of computer program 1000 on user device 100, for enabling a listener or viewer 105 of broadcast programs, to access from a topic selection object 300 defined on a document 101 multimedia information or services from one or a plurality of servers 803 connected to a network 620 by means of one or plurality of hyperlinks 911, 912, 913 retrieved on an hyperlink list 901 from a Broadcast Channel Information Server 109. Computer program 1000 performs the following steps:

1201—receiving from the user, an input gesture 920 selecting a topic selection object 300;
1202—retrieving the hyperlinks list 901 associated with the selected topic selection object 300;
1203—displaying on the user device screen, the hyperlinks list 901;
1204—receiving from the user, an input gesture 930 selecting an hyperlink 912 among the one or plurality of hyperlinks 911, 912, 913 comprised in the hyperlinks list 901;
1205—using the resource address URL 804 of the selected hyperlink 912, for accessing multimedia information or service on a server 806 connected to the network 620;
1206—retrieving from the accessed server 806, the multimedia information or service 807;
1207—displaying or playing the multimedia information or service 807 on the user device 100.

FIGS. 8 and 9 show how a user 105 selects 920 a topic selection object 300 from a document 101. From the hyperlinks list 901 associated with the selected topic selection object 300, the hyperlink list and the selected topic selection object being displayed on the same document the user selects 930 a hyperlink e.g., "The Hostess with the Mostes' in the Ball" 912. Then using the URL encoded on the selected entry 912, e.g.,
http://www.seeklyrics.com/lyrics/Berlin-Irving/Hostess-With-The-Mostes-On-The-Ball-The.html
the user activates the hyperlink to retrieve through the internet 620, the desired information or service e.g., html file: Hostess-With-The-Mostes-On-The-Ball-The.html 807. The corresponding request 804 is sent from the user device 100 to the hyperlinked Web server 806 e.g., www.seeklyrics.com. The received information or service 807 is finally played or displayed to the user 105 by means of a browser program on the user device 100. It is important to note that, according to a particular embodiment of the present invention, the activation of a single hyperlink on an hyperlink list can be automatic, immediately after its reception by the user device 100.

Computer Program

Computer program 1000 is loaded into user device 100 from a computer-readable medium such as a magnetic disk or tape, optical disk or DVD, or downloaded from a network (when downloaded from a communications network 620.) Computer program 1102, 1103 is loaded into server 109 from a computer-readable medium such as a magnetic disk or tape, optical disk or DVD, or downloaded from a network (when downloaded from a communications network 620.) Computer program 1000 comprise instructions for carrying out the following steps when executed on the user device 100:

receiving a user input 920 for selecting a topic selection object 300;
retrieving the hyperlinks list 901 associated with the selected topic selection object 300;
displaying the hyperlinks list 901 on the user device 100 screen;
receiving a user input 930 for selecting an hyperlink 912 among the one or plurality of hyperlinks 911, 912, 913 comprised on the hyperlinks list 901;
from the resource address URL 804 of the selected hyperlink 912, accessing multimedia information or service on a server 806 connected to the network 620;
retrieving from the accessed server 806, the multimedia information or service 807; and
displaying or playing the multimedia information or service 807.

While the invention has been shown and described with reference to a preferred embodiment, it will be understood that various changes in form and detail may be made therein without departing from the spirit, and scope of the invention.

The invention claimed is:

1. A method of obtaining WWW information of interest to a user, the WWW information being related to a subject currently being presented in a program currently being broadcast, the method comprising the steps of:
while the program is broadcast, a client computing device receiving from a user (a) a selection indicating interest by the user in the subject currently being presented in the program currently being broadcast and (b) a selection of a document electronically stored on the client computing device to which to correlate information correlated to the subject, and in response, the client computing device sending a request via a network to a server computer for information correlated to the subject, the request identifying the program and an approximate time that the user indicated the interest in the program, and in response, the client computing device receiving from the server computer via the network a hyperlink for information correlated to the subject based on the identified program and the approximate time that the user indicated interest in the program, and in response, the user device correlating the hyperlink to the selected document; and
the client computing device displaying the selected document and displaying the hyperlink at a first position in the selected document and subsequently receiving a selection from the user indicating a second, different position in the displayed document to position the hyperlink, and in response, the client computer device displaying the hyperlink at the second position indicated by the user in the selected document instead of the first position, and making a record that the hyperlink is correlated to the second position indicated by the user in the selected document; and wherein
the selected document is one of a multiplicity of documents electronically stored on the client computer device which were alternatively selectable by the user individually to which to correlate the information correlated to the subject and to which the hyperlink and the position of the hyperlink are correlated.

2. The method of claim 1 wherein the program is broadcast via a television channel, and the request identifies the program in part by identifying the channel of the television program.

3. The method of claim 1 wherein the server computer has a list of hyperlinks cross-referenced to corresponding elapsed times from a start of the program, and the hyperlink received by the client computing device was obtained from the list based on the identified channel and the approximate time.

4. The method of claim 1 further comprising the subsequent step of the client computing device receiving from the user a selection of the hyperlink, and in response, the client computing device downloading via a network a web page or web file addressed by the hyperlink and displaying the web page or web file.

5. The method of claim 1 wherein the program is a television broadcast.

6. The method of claim 1 wherein the multiplicity of documents were previously created by the user without knowledge of the program being broadcast.

7. The method of claim 1 wherein the selected document is not a web page.

8. The method of claim 1 wherein the selected document is not a markup language document.

9. A computer program product for obtaining WWW information of interest to a user, the WWW information being related to a subject currently being presented in a broadcast program currently being broadcast, the computer program product comprising:

one or more computer-readable tangible storage devices and computer program instructions stored on at least one of the one or more storage devices for execution in a client computing device, the computer program instructions comprising;

program instructions to receive from a user (a) a selection indicating interest by the user in the subject currently being presented in the broadcast program currently being broadcast and (b) a selection of a document electronically stored on the client computing device to which to correlate information correlated to the subject;

program instructions, responsive to the user selections, to send a request via a network to a server computer for information correlated to the subject, the request identifying the broadcast program and an approximate time that the user indicated the interest in the program;

program instructions to receive from the server computer via the network a hyperlink for information correlated to the subject based on the identified broadcast program and the approximate time that the user indicated interest in the broadcast program;

program instructions to correlate the hyperlink to the selected document; and program instructions to display the selected document and display the hyperlink at a first position in the selected document and subsequently receive a selection from the user indicating a second, different position in the displayed document to position the hyperlink, and in response, to display the hyperlink at the second position indicated by the user in the selected document and make a record that the hyperlink is correlated to the second position indicated by the user in the selected document; and wherein the selected document is one of a multiplicity of documents electronically stored on the client computer device which were alternatively selectable by the user individually to which to correlate the information correlated to the subject and to which the hyperlink and the position of the hyperlink are correlated.

10. The computer program product of claim 9 wherein the broadcast program is broadcast via a television channel, and the request identifies the broadcast program in part by identifying the channel of the television program.

11. The computer program product of claim 9 wherein the server computer has a list of hyperlinks cross-referenced to corresponding elapsed times from a start of the broadcast program, and the hyperlink received by the client computing device was obtained from the list based on the identified channel and the approximate time.

12. The computer program product of claim 9 further comprising program instructions, stored on at least one of the one or more storage devices, to receive from the user a selection of the hyperlink, and in response, to download via a network a web page or web file addressed by the hyperlink and display the web page or web file.

13. The computer program product of claim 9 wherein the broadcast program is a television broadcast.

14. The computer program product of claim 9 wherein the multiplicity of documents were previously created by the user without knowledge of the program being broadcast.

15. The computer program product of claim 9 wherein the selected document is not a web page.

16. A computer system product for obtaining WWW information of interest to a user, the WWW information being related to a subject currently being presented in a broadcast program currently being broadcast, the computer system comprising:

one or more processors, one or more computer-readable memories, one or more computer-readable tangible storage devices, and program instructions stored on at least one of the one or more storage devices for execution by at least one of the one or more processors via at least one of the one or more memories, the program instructions comprising:

program instructions to receive from a user (a) a selection indicating interest by the user in the subject currently being presented in the broadcast program currently being broadcast and (b) a selection of a document electronically stored on the client computing device to which to correlate information correlated to the subject;

program instructions, responsive to the user selections, to send a request via a network to a server computer for information correlated to the subject, the request identifying the broadcast program and an approximate time that the user indicated the interest in the program;

program instructions to receive from the server computer via the network a hyperlink for information correlated to the subject based on the identified broadcast program and the approximate time that the user indicated interest in the broadcast program;

program instructions to correlate the hyperlink to the selected document; and program instructions to display the selected document and display the hyperlink at a first position in the selected document and subsequently receive a selection from the user indicating a second, different position in the displayed document to position the hyperlink, and in response, to display the hyperlink at the second position indicated by the user in the selected document and make a record that the hyperlink is correlated to the second position indicated by the user in the selected document; and wherein the selected document is one of a multiplicity of documents electronically stored on the client computer device which were alternatively selectable by the user individually to which to correlate the information correlated to the subject and to which the hyperlink and the position of the hyperlink are correlated.

17. The computer system of claim 16 wherein the broadcast program is broadcast via a television channel, and the request identifies the broadcast program in part by identifying the channel of the television program.

18. The computer system of claim 16 wherein the server computer has a list of hyperlinks cross-referenced to corresponding elapsed times from a start of the broadcast program, and the hyperlink received by the client computing device was obtained from the list based on the identified channel and the approximate time.

19. The computer system of claim 16 further comprising program instructions, stored on at least one of the one or more storage devices for execution by at least one of the one or more processors via at least one of the one or more memories, to receive from the user a selection of the hyperlink, and in response, to download via a network a web page or web file addressed by the hyperlink and display the web page or web file.

20. The computer system of claim 16 wherein the selected document is not a markup language document.

* * * * *